(12) United States Patent
Schaber et al.

(10) Patent No.: US 11,566,572 B2
(45) Date of Patent: Jan. 31, 2023

(54) METHOD FOR OPERATING AN INTERNAL COMBUSTION ENGINE OF A MOTOR VEHICLE WITH AN AUTOMATIC TRANSMISSION

(71) Applicant: Daimler AG, Stuttgart (DE)

(72) Inventors: Michael Schaber, Gechingen (DE); Stephan Baumgartner, Gruenwald (DE); Goetz Schneider, Winnenden (DE); Naser Rouholamin, Berglen (DE)

(73) Assignee: Daimler AG, Stuttgart (DE)

( * ) Notice: Subject to any disclaimer, the term of this patent is extended or adjusted under 35 U.S.C. 154(b) by 162 days.

(21) Appl. No.: 16/627,935

(22) PCT Filed: Jun. 12, 2018

(86) PCT No.: PCT/EP2018/065419
§ 371 (c)(1),
(2) Date: Dec. 31, 2019

(87) PCT Pub. No.: WO2019/007640
PCT Pub. Date: Jan. 10, 2019

(65) Prior Publication Data
US 2021/0277841 A1    Sep. 9, 2021

(30) Foreign Application Priority Data
Jul. 1, 2017    (DE) .................... 10 2017 006 240.4

(51) Int. Cl.
*F02M 1/00*    (2006.01)
*F02D 41/02*    (2006.01)
(Continued)

(52) U.S. Cl.
CPC ..... *F02D 41/0225* (2013.01); *F02D 41/1454* (2013.01); *F02D 41/401* (2013.01); *F02D 41/405* (2013.01); *F02D 2250/21* (2013.01)

(58) Field of Classification Search
CPC .............. F02D 19/081; F02D 41/0025; F02D 41/1454; F02D 2001/165; F02P 5/1504; F02P 5/04
See application file for complete search history.

(56) References Cited

U.S. PATENT DOCUMENTS

| | | | |
|---|---|---|---|
| 5,109,826 A | 5/1992 | Kato | |
| 2010/0082220 A1 | 4/2010 | Whitney et al. | |

(Continued)

FOREIGN PATENT DOCUMENTS

| | | |
|---|---|---|
| DE | 40 23 971 A1 | 2/1991 |
| DE | 102 17 238 A1 | 11/2003 |

(Continued)

OTHER PUBLICATIONS

International Search Report (PCT/ISA/210) issued in PCT Application No. PCT/EP2018/065419 dated Sep. 11, 2018 with English translation (five (5) pages).

(Continued)

*Primary Examiner* — John Kwon
(74) *Attorney, Agent, or Firm* — Crowell & Moring LLP

(57) ABSTRACT

In a method for operating an internal combustion engine of a motor vehicle having an automatic transmission, a torque generated by the internal combustion engine is reduced as a function of an operating state of a drive train of the motor vehicle. As a function of an excess of combustion air occurring when the torque is reduced and supplied to the internal combustion engine by an exhaust gas turbocharger, fuel combustion efficiency in at least one combustion chamber of the internal combustion engine, which is related to the (Continued)

torque generated by the combustion chamber, is reduced. The combustion efficiency is reduced by at least one late post-injection of fuel into the at least one combustion chamber of the internal combustion engine.

13 Claims, 4 Drawing Sheets

(51) Int. Cl.
*F02D 41/14* (2006.01)
*F02D 41/40* (2006.01)

(56) References Cited

U.S. PATENT DOCUMENTS

| | | | |
|---|---|---|---|
| 2014/0373510 A1* | 12/2014 | Schroder | F01N 13/0097 60/274 |
| 2015/0051762 A1 | 2/2015 | Banker et al. | |
| 2015/0192087 A1 | 6/2015 | Shirahashi et al. | |
| 2019/0024572 A1* | 1/2019 | Kurtz | F02B 7/04 |
| 2019/0024604 A1* | 1/2019 | Kurtz | F02D 41/402 |

FOREIGN PATENT DOCUMENTS

| | | |
|---|---|---|
| DE | 10 2009 000 933 A1 | 10/2009 |
| DE | 10 2009 043 212 A1 | 5/2010 |
| DE | 10 2014 215 745 A1 | 2/2015 |
| DE | 10 2014 019 359 A1 | 7/2015 |
| DE | 10 2014 006 471 A1 | 10/2015 |
| FR | 2 840 649 A1 | 12/2003 |
| FR | 2 901 318 A1 | 11/2007 |
| WO | WO 03/018974 A1 | 3/2003 |
| WO | WO 2009/136819 A1 | 11/2009 |

OTHER PUBLICATIONS

German-language Written Opinion (PCT/ISA/237) issued in PCT Application No. PCT/EP2018/065419 dated Sep. 11, 2018 (five (5) pages).

German-language Search Report issued in counterpart German Application No. 10 2017 006 240.4 dated Feb. 20, 2018 with English translation (13 pages).

German-language Office Action issued in German Application No. 10 2017 006 240.4 dated Jan. 4, 2022 (10 pages).

Chinese-language Office Action issued in Chinese Application No. 201880044032.8 dated Apr. 20, 2022 with partial English translation (nine (9) pages).

Chinese-language Office Action issued in Chinese Application No. 201880044032.8 dated Sep. 19, 2022 with English translation (12 pages).

Xin, Section 2 "Combustion Thermochemistry," Chapter 4, Fuel and Combustion, Principles of Engines of Automobile and Tractor, Edition 2, pp. 98-101, Jan. 31, 2015, Beijing: China Agricultural University Press (11 pages).

* cited by examiner

METHOD FOR OPERATING AN INTERNAL COMBUSTION ENGINE OF A MOTOR VEHICLE WITH AN AUTOMATIC TRANSMISSION

BACKGROUND AND SUMMARY OF THE INVENTION

The present invention relates to a method for operating an internal combustion engine of a motor vehicle with an automatic transmission. A torque generated by the internal combustion engine is hereby reduced depending on an operating state of a drive train of the motor vehicle.

By way of example, in the case of a motor vehicle with an automatic transmission, the torque generated by the internal combustion engine during an upshift at full-load is limited. In particular, a transmission control device, for example, requires the engine control device to limit or reduce the torque. In the case of a full load acceleration, this request leads to a reduction in the engine torque, i.e. the torque generated by the internal combustion engine. After the shifting process has been completed, the torque limitation is cancelled again.

In the case of an internal combustion engine designed as a diesel engine, for example, the injection quantity, i.e. the quantity of fuel injected into a respective combustion chamber of cylinders of the internal combustion engine, is reduced by means of the engine control unit. However, the lower amount of fuel injected reduces the enthalpy of the exhaust gases. In addition, the boost pressure provided by an exhaust gas turbocharger in the motor vehicle decreases even if a bypass or a so-called wastegate is completely closed. The bypass allows gas is to be routed past a turbine of the exhaust gas turbocharger, such that this exhaust gas flow does not contribute to increasing the boost pressure by means of a compressor of the exhaust gas turbocharger.

The torque limitation is therefore noticeable due to a sharp drop in boost pressure during an upshift. This is associated with a worse or less harmonious connection in the next higher gear, namely when a torque release is transmitted from the transmission control unit to the engine control unit. This is due to the fact that, because of the lack of boost pressure, only a lower torque can be transmitted from the internal combustion engine than is possible at higher boost pressure.

German document DE 10 2009 000 933 A1 describes a fuel injection control device of a direct injection combustion engine having a charger. An additional injection is carried out in a time span from a medium stage to a late stage of a compression stroke. Consequently, combustible gas components containing unburned hydrocarbons are released into an exhaust pipe. The combustible exhaust components burn in the exhaust pipe and thus increase the charging pressure of the charger. In this way, acceleration response behavior should be improved.

The object of the present invention is to improve a method of the type mentioned above in such a way that the disadvantages associated with reducing the torque are at least mitigated.

This object is achieved by a method with features of claimed. Advantageous embodiments with appropriate developments of the invention are reflected in the dependent claims.

In the case of the method according to the invention for operating an internal combustion engine of a motor vehicle with an automatic transmission, a torque generated by the internal combustion engine depending on an operating state of a drive train of the motor vehicle is reduced. This reduces the efficiency of combustion of fuel in at least one combustion chamber of the internal combustion engine depending on the excess combustion air occurring when the torque is reduced. The combustion air is supplied to the internal combustion engine by means of an exhaust gas turbocharger. The efficiency is based on the torque generated by the internal combustion engine. In other words, the efficiency in the case of combustion of fuel is reduced to such an extent that part of the fuel introduced into the combustion chamber is not or at most hardly effective with respect to the torque generated by the internal combustion engine.

A substantially torque-neutral combustion of fuel thus takes place in the at least one combustion chamber of a respective cylinder of the internal combustion engine. However, the torque-neutral combustion of the fuel leads to a significant increase in the enthalpy of the exhaust gases. This in turn means that the boost pressure applied by the exhaust gas turbo pressure can be maintained to a particularly large extent.

The decline of the boost pressure, known from the prior art, due to the reduction of the torque generated by the internal combustion engine therefore does not occur or occurs to a very greatly reduced extent. Accordingly, the disadvantages associated with the reduction in torque are at least mitigated. This is because, for example, a gear change results in an improved connection in the next gear, i.e. after the gear change. In addition, the torque progression over the gear change is particularly harmonious. For a user of the motor vehicle, this is noticeable as a subjectively shorter shifting time.

After a gear change, the desired boost pressure can also be readjusted very quickly. This is because the boost pressure can be better maintained during shifting by deliberately worsening the efficiency. The torque release following the gear change is therefore particularly fast and particularly harmonious, such that a noticeably better connection or vehicle acceleration is achieved for the vehicle user.

Due to the stabilization of the boost pressure applied by the exhaust gas turbocharger, overshoots of the boost pressure and the turbo charger speed are also reduced. Measures to protect the exhaust gas turbocharger can therefore be particularly aggressive even during transient operation of the exhaust gas turbocharger. This is because the danger of damage to the exhaust gas turbocharger is also reduced, for example due to lower overshoots of the boost pressure, in particular after a gear change. In addition, the design of set points of the boost pressure and the control of the boost pressure are improved.

Also with regard to exhaust gas recirculation, it is advantageous to quickly reach the desired charge pressure after the torque limitation has been removed, i.e. after the reduction of the torque generated by the internal combustion engine has been removed. The exhaust gas recirculation rate depends on the combustion air ratio. If the combustion air ratio drops, the exhaust gas recirculation rate is usually reduced. This is because efforts are made not to fall below a minimal value of the combustion air ratio. Due to these restrictions, non-stationary, i.e. transient driving manoeuvres, in which the torque generated by the internal combustion engine changes rapidly, frequently result in limitation of the exhaust gas recirculation rate. Such restrictions are not as common in the method described here. This is advantageous with regard to particulate emissions and nitrogen oxide emissions from the internal combustion engine. It is thus possible for the internal combustion engine to generate a high output while at the same time achieving low nitrogen oxide emissions and particulate emissions from the motor vehicle.

In the case of a full load acceleration from 0 km/h to 100 km/h, the method described above can be used to achieve an improvement of 0.2 seconds to 0.4 seconds. By introducing fuel into the at least one combustion chamber of the internal combustion engine, with no effect on the torque, as a function of the excess combustion air, the enthalpy of the exhaust gases in a turbine of the exhaust gas turbocharger can be increased and thus the boost pressure drop can be counteracted.

Due to the excess of combustion air, complete combustion of the fuel introduced non-torque effectively takes place in the at least one combustion chamber. Consequently, the introduction of the fuel does not lead to a deterioration of the emissions with regard to carbon monoxide and hydrocarbons.

Maintaining the excess air during torque reduction, however, leads to a higher boost pressure when the torque limitation or the torque reduction is removed again. Furthermore, following the torque reduction, i.e. after the torque limitation has been removed, there is a particularly low air shortage. Delaying an injection quantity release to limit smoke, i.e. to prevent the adjustment of a mixture that is too heavy, is therefore less pronounced and active for less time, in particular in transient or dynamic, i.e. non-stationary operating states of the internal combustion engine. Accordingly, more torque is available particularly quickly.

The reduction in the exhaust gas recirculation rate, which is dependent on the combustion air ratio and occurs in particular in transient operating conditions of the internal combustion engine, is also less active. Accordingly, a higher exhaust gas recirculation rate is possible. Consequently, fewer nitrogen oxides are released than would be the case with a lower exhaust gas recirculation rate.

The automatic transmission can be an automated manual transmission, an automatic torque-converter transmission or a dual clutch transmission. Furthermore, the internal combustion engine can be designed as a petrol engine or as a diesel engine.

The operating status of the drive train, depending on which the torque generated is reduced, can be a gear change. Accordingly, the torque generated by the internal combustion engine can be reduced by changing to a higher gear or a lower gear. By way of example, a torque reduction requirement, i.e. a reduction in the torque generated by the internal combustion engine, can occur when shifting up to a higher gear, in particular at high load or full load. Furthermore, a torque withdrawal requirement can occur when shifting back to the lower gear at high load, for example when shifting back or down from third gear to second gear when driving up an incline. In such situations, the drop in boost pressure can thus be prevented or reduced to a particularly large extent.

Additionally or alternatively, the torque reduction can be caused by the intervention of an electronic stability program. In particular, the torque generated by the internal combustion engine can therefore be reduced by an intervention caused by the electronic stability program. Here too, avoiding or reducing the boost pressure drop is advantageous.

Furthermore, there may be a requirement for a torque withdrawal or a reduction of the torque generated by the internal combustion engine in the case of the motor vehicle creeping. During this creeping, the power flow in the transmission is not interrupted, but rather the automatic transmission, especially the dual clutch transmission, remains engaged. Here, the torque withdrawal provides protection for the clutch. Even if the torque generated by the internal combustion engine is reduced when the vehicle creeps, it is still advantageous to reduce the efficiency as a function of the excess combustion air.

Preferably, a predetermined combustion air ratio is taken into account when determining the excess combustion air. In particular, the predetermined combustion air ratio is a thin mixture because it ensures efficient operation of the internal combustion engine with regard to fuel consumption. The excess combustion air can then be determined in relation to this predetermined combustion air ratio.

Preferably, a plurality of parameters describing an operating state of the internal combustion engine will be considered to determine the excess of combustion air. By way of example, the speed of the internal combustion engine, the effective injection quantity, the temperature of the air in an intake manifold of the internal combustion engine and the boost pressure in the intake manifold can be used to determine the excess. However, such additional or alternative parameters such as air mass and the filling and ambient pressures can also be used to determine the excess combustion air.

Preferably, the efficiency of the combustion shall be reduced due to at least one later post-injection of fuel into the at least one combustion chamber of the internal combustion engine. A quantity and/or time of at least one later post-injection can be adjusted depending on the excess of combustion air.

Further advantages, features and details of the invention are apparent from the following description of preferred exemplary embodiments as well as from the drawings. The features and combinations of features mentioned above in the description as well as the features and combinations of features mentioned below in the figure description and/or shown in the figures alone can be used not only in the combination specified in each case, but also in other combinations or in a unique position without departing from the scope of the invention.

DETAILED DESCRIPTION OF THE INVENTION

Figure 1:
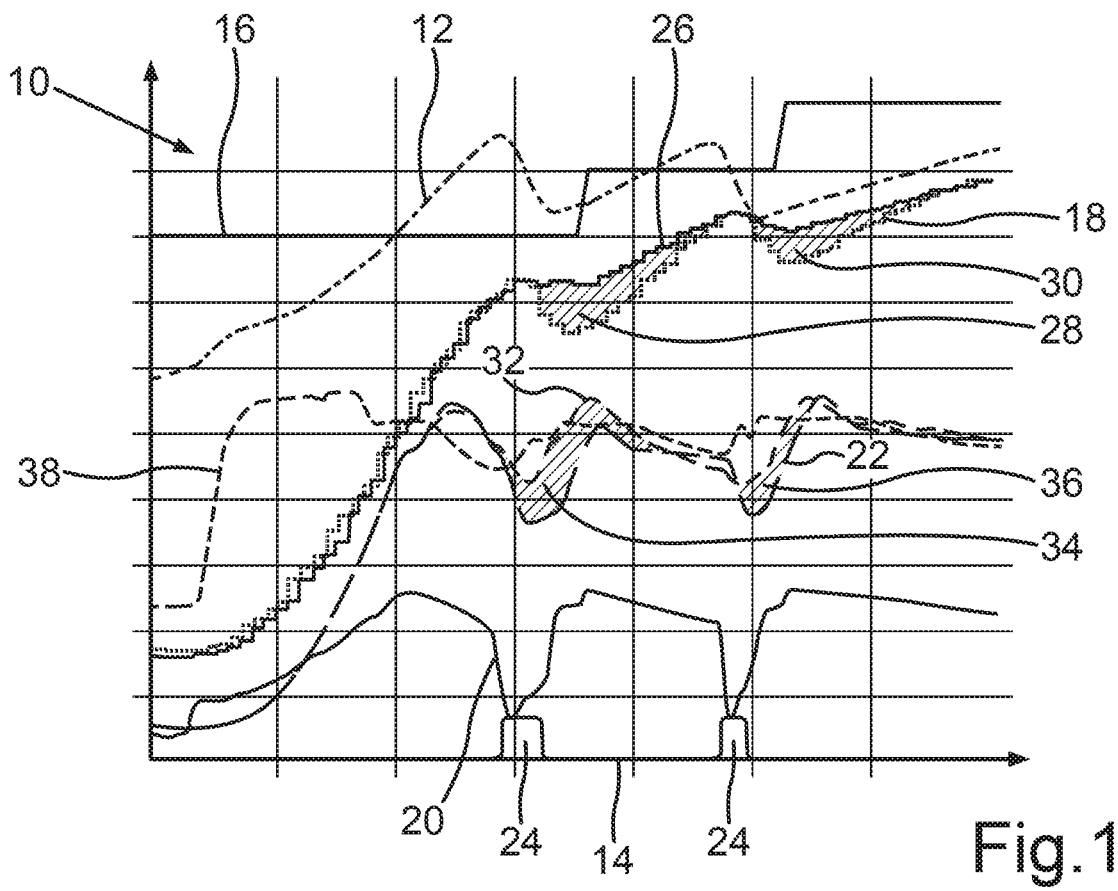
FIG. 1 shows, in a graph, the effects of a late post-injection on exhaust gas temperature and boost pressure when changing to a higher gear in a motor vehicle with automatic transmission.

FIG. 1 illustrates how, in a motor vehicle with an automatic transmission, an undesirable large drop in boost pressure can be avoided by raising the enthalpy of the exhaust gas by means of a late post-injection during an upshift. If, for example, the automatic transmission shifts to higher gear at high load and, in particular, at full load of an internal combustion engine of the motor vehicle, the torque generated by the internal combustion engine is temporarily reduced.

The internal combustion engine described above by way of example is, in particular, a diesel engine. A transmission control unit of the automatic transmission accordingly prompts the engine control unit of the diesel engine to reduce the engine torque, i.e. the torque generated by the diesel engine, during a full-load upshift, for example. In the diesel engine, this is implemented by reducing the amount of fuel injected. The amount of injected fuel is thus reduced. As a result, however, the enthalpy of the exhaust gas from a turbine of an exhaust turbocharger decreases. Accordingly, the boost pressure provided by a compressor of the exhaust gas turbocharger drops, even if a bypass to circumvent the turbine is closed.

If the target gear is then engaged in the automatic transmission and, in turn, a torque is released from the transmission control unit, the injection quantity and thus also the engine torque are nevertheless limited for a certain time. This is due to the fact that due to the low boost pressure, no more fuel can be injected into the respective combustion chamber of the diesel engine cylinder than is intended for a desired combustion air ratio (lambda). This is illustrated by FIG. 1.

In a graph 10 in FIG. 1, a first curve 12 illustrates the temporal progress of the engine speed of the diesel engine, which is plotted on a time axis 14. A further, stepped curve 16 illustrates the gear engaged in the automatic transmission when shifting up. Accordingly, the engine speed drops before each gear change. A further curve 18 illustrates the temporal progress of the exhaust gas temperature as it occurs as a result of the injection quantity reduction carried out at the time of gear change. Accordingly, the reduction in the injected amount of fuel causes a drop in temperature, which occurs during the respective gear change. A further curve 20 illustrates the fuel injection quantity effective for the torque generated by the diesel engine. Accordingly the amount of fuel injected and effective for torque is reduced immediately before changing gears. This is also reflected in a drop in boost pressure provided by the turbocharger compressor, which is illustrated by another curve 22 in FIG. 1.

This boost drop is prevented as described below. Namely, a late post-injection 24 is carried out at each gear change. However, this post-injection 24 is not torque-effective.

In the present case, the late post-injection 24 ensures that the exhaust gas temperature rises, which is shown in FIG. 1 by a further curve 26. The respective regions 28, 30 between curve 18 and curve 26 illustrate in FIG. 1 the increase in the exhaust gas temperature caused by the late post-injections 24. Furthermore, a further curve 32 illustrates the temporal progress of the boost pressure provided by the exhaust gas turbocharger. Here, the respective regions 34, 36 also indicate the boost pressures increases, which are caused by the late post-injections 24. It can be recognised that the boost pressure hardly drops at all, but follows the respective nominal value very well, wherein the nominal value of the boost pressure in FIG. 1 is illustrated by a further curve 38.

In the present case, the fact that the boost pressure during the short-term torque reduction is higher than required for the operating state of the internal combustion engine is exploited when the fuel is injected by means of late post-injections 24. This is due to the inertia of the turbocharger. This inertia leads to an excess of combustion air or to an excess of filling during the short-term torque reduction, which can be triggered, for example, by the gear change or, alternatively, by an intervention of an electronic stability program.

This excess of combustion air makes it possible to carry out an additional injection, for example, in the form of the late post-injection 24, and thus to increase the exhaust gas enthalpy in the combustion chamber of the respective cylinder in a torque-neutral or non-torque-effective manner. The late post-injection 24 takes place clearly after the top dead center, where the ignition of fuel injected into the combustion chamber takes place. The exhaust gas enthalpy is therefore used in this case for the best possible preservation of the excess filling, i.e. the excess combustion air.

After completion of the torque reduction, the remaining excess filling is then used for a particularly fast torque build-up. With regard to the release of nitrogen oxides, however, the (respective) late post-injection 24 is neutral, since the combustion center is also shifted late in the direction and thus the pressure peaks and temperature peaks are lower. Also with regard to the emission of carbon monoxide and hydrocarbons, the method does not lead to a higher load, since due to the excess air, a complete combustion of the torque-neutral (and additionally) injected fuel quantity takes place, i.e. the fuel quantity injected by means of post-injection 24.

Maintaining excess air during torque reduction, however, leads to higher charging pressures following the torque reduction, i.e. when the full torque can be generated again by the internal combustion engine or the diesel engine. In addition, a smaller air shortage occurs after the torque reduction. This means that the injection quantity is released with less delay, such that more torque is available more quickly. In addition, a transient reduction in an exhaust gas recirculation rate depending on the combustion air ratio is less active, such that a higher exhaust gas recirculation rate is possible. This leads to a reduced release of nitrogen oxides.

Figure 2:
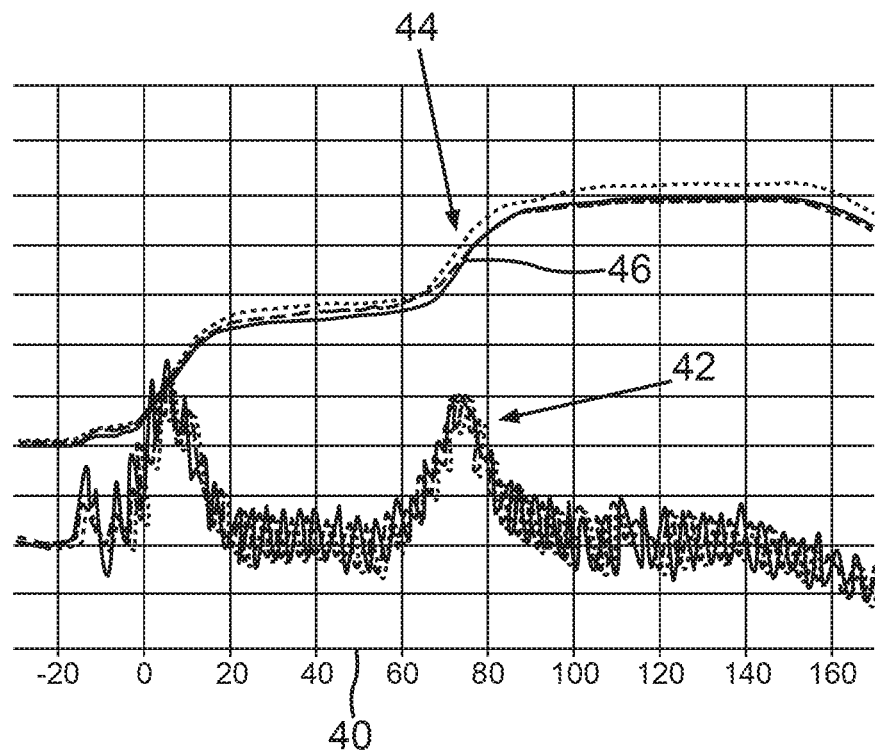
FIG. 2 shows, in a further graph, a heat release due to the late post-injection, and an integral of the heating process.

In FIG. 2, the crankshaft angle is plotted on an ordinate 40 in degrees, wherein a crankshaft angle of 0 degrees corresponds to the top dead center at the ignition of the fuel. A first array of curves 42 illustrates the heat release by the individual cylinders of the internal combustion engine due to the main injection carried out at a top dead center and due to the late post-injection 24. The late post-injection 24 can accordingly be carried out, for example, in a range of from 60 degrees crankshaft angle to 80 degrees crankshaft angle after the top dead center. A further array of curves 44 illustrates the integral of the heating process. Here, an increase 46 indicates the proportion of late post-injection 24 in the heating process. This illustration also shows the increase in exhaust gas temperature due to the late post-injection 24.

Figure 3:
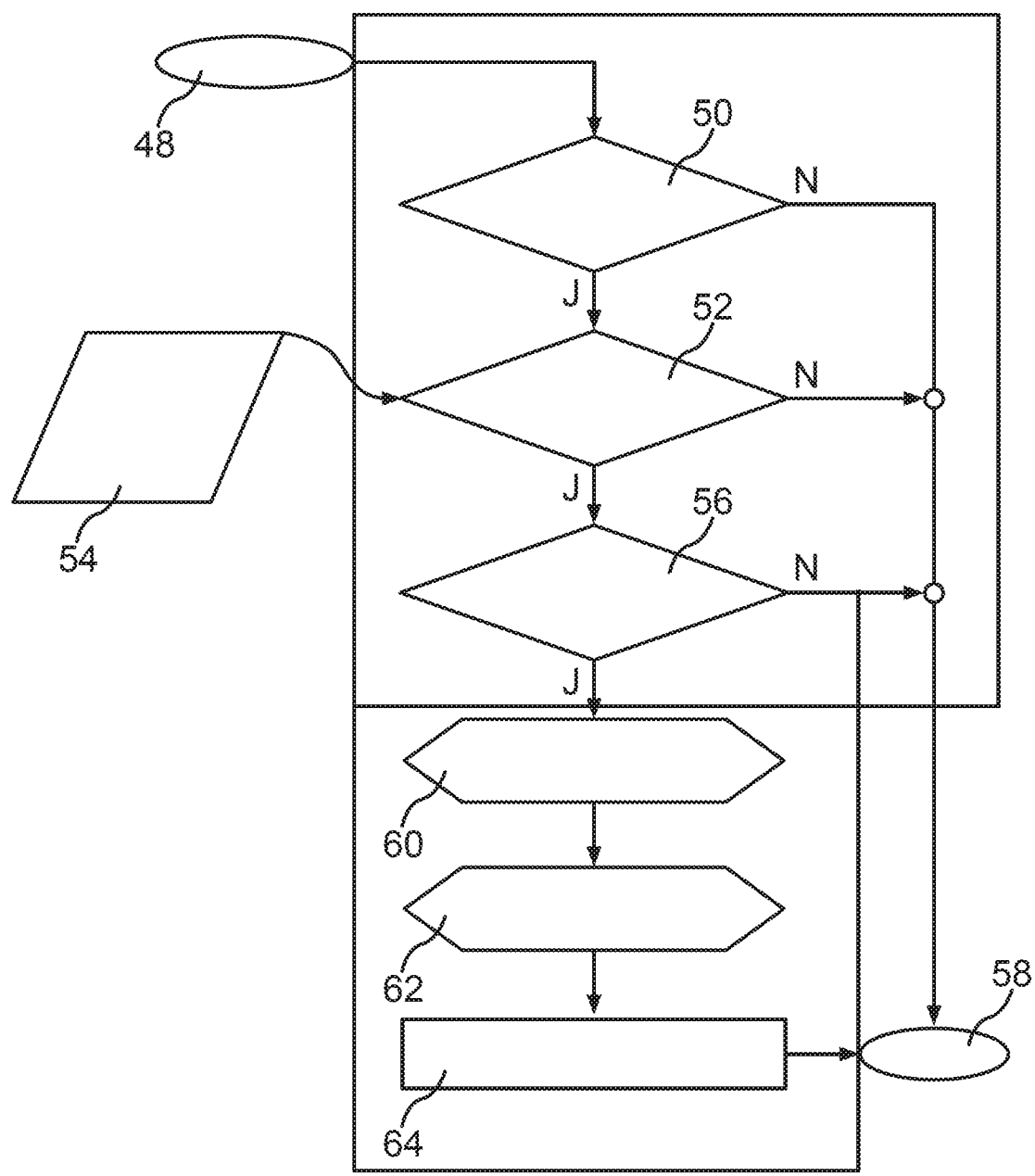
FIG. 3 is a flowchart for illustrating a method in which the late post-injection reduces a boost pressure drop following torque reduction.

FIG. 3 is intended to illustrate when, for example, late post-injection 24 is carried out in order to raise the enthalpy of the exhaust gases and to avoid a drop in boost pressure. After a start 48 of the method, a query 50 is made as to whether an external intervention in the sense of a reduction of the torque is present. Such a reduction in the torque delivered by the diesel engine may occur, for example, in the case of upshifting under full load, downshifting under high load, the motor vehicle creeping, or an intervention of the electronic stability program. If such an external intervention is present, a next step 52 is to check whether a predetermined operating state has been enabled. This is done, for example, by means of an evaluation 54 of data or parameters such as load, position of an accelerator pedal, rotational speed, engaged gear, boost pressure or engine temperature.

If the operating state is enabled, it is checked in a subsequent step 56 whether the duration of the torque withdrawal or the external intervention is less than a predetermined limit or shorter than a period of predetermined duration. In other words, step 56 checks whether the torque reduction is a temporarily required intervention. Especially in the case of a torque withdrawal for a gear change, a period of approximately 500 milliseconds can be provided for reducing the generated torque.

If the duration of the intervention is not less than the limitation, the method achieves an end 58. If, however, the duration of the intervention is less than the limitation, then a calculation 60 of a filling excess, i.e. an excess of combustion air, related to a predetermined combustion air ratio (lambda), i.e. related to a target value for the combustion air ratio, is carried out. On the basis of this excess, the additional post-injection 24 is then calculated in a subsequent step 62, namely the quantity and the injection time. This is followed by the implementation 64 of the post-injection 24, before the method reaches the end 58.

Figure 4:
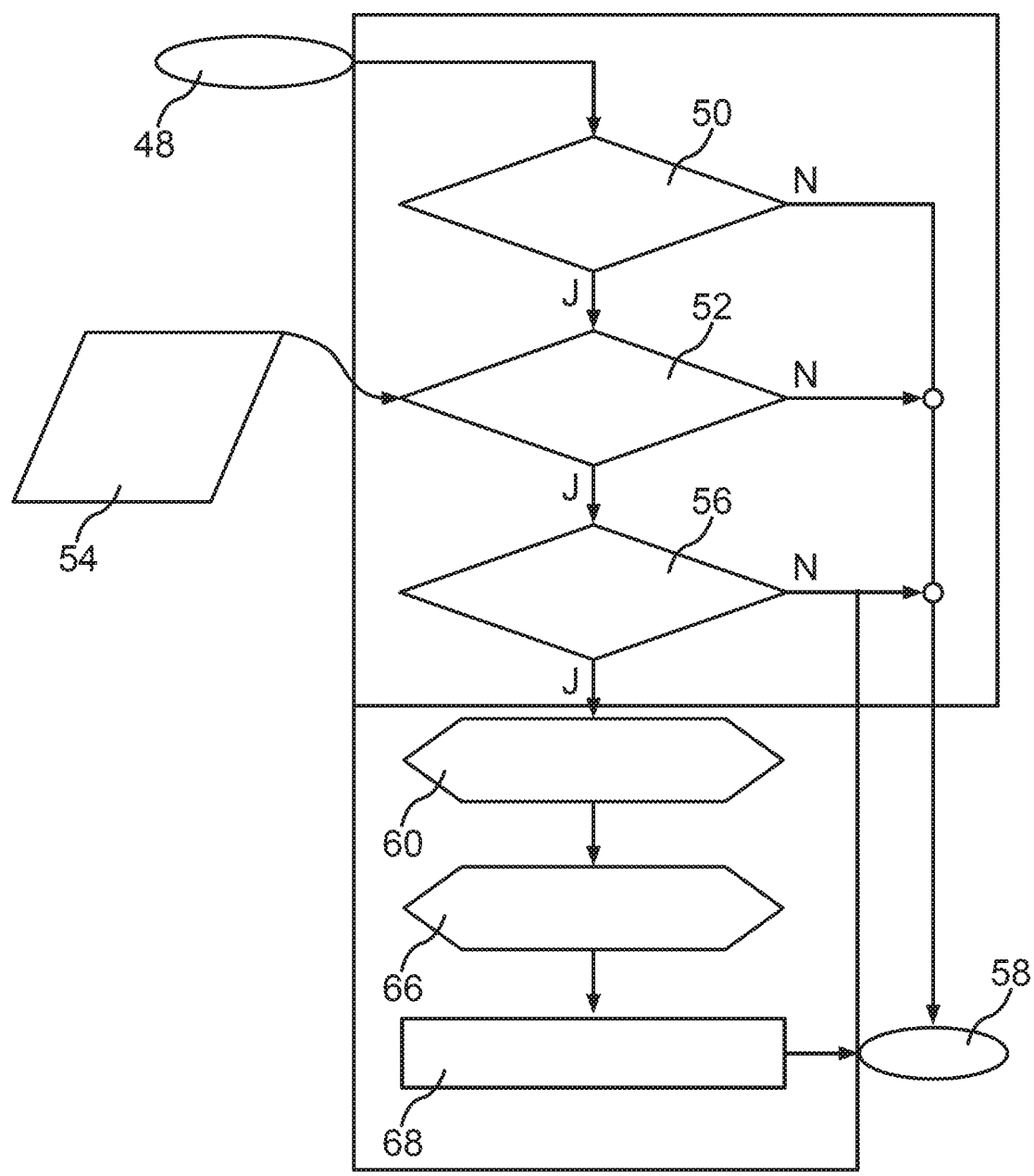
FIG. 4 is a flowchart for illustrating an alternative method of otherwise achieving a reduction in the efficiency of combustion fuel in combustion chambers of the internal combustion engine.

FIG. 4 is intended to describe an alternative method in which the steps up to the calculation 60 are the same as the method according to FIG. 3. However, there is another way of achieving a deterioration in the efficiency of the internal combustion engine with regard to the torque generated by the internal combustion engine. The deterioration in efficiency in the form of post-injection 24 with no effect on torque is thus replaced by another type of deterioration in efficiency. Accordingly, the calculation 60 is followed by a determination 66 of the efficiency reduction. By way of example, the ignition timing of an internal combustion engine designed as a petrol engine can be adjusted, or the injection timing of a main injection can be changed. Accordingly, other forms of reducing or diminishing the efficiency of the combustion of fuel based on internal engine adjustment parameters are also conceivable.

In a step following the determination 66, the implementation 68 of the reduction of the combustion efficiency occurs in turn before the method reaches the end 58.

Figure 5:
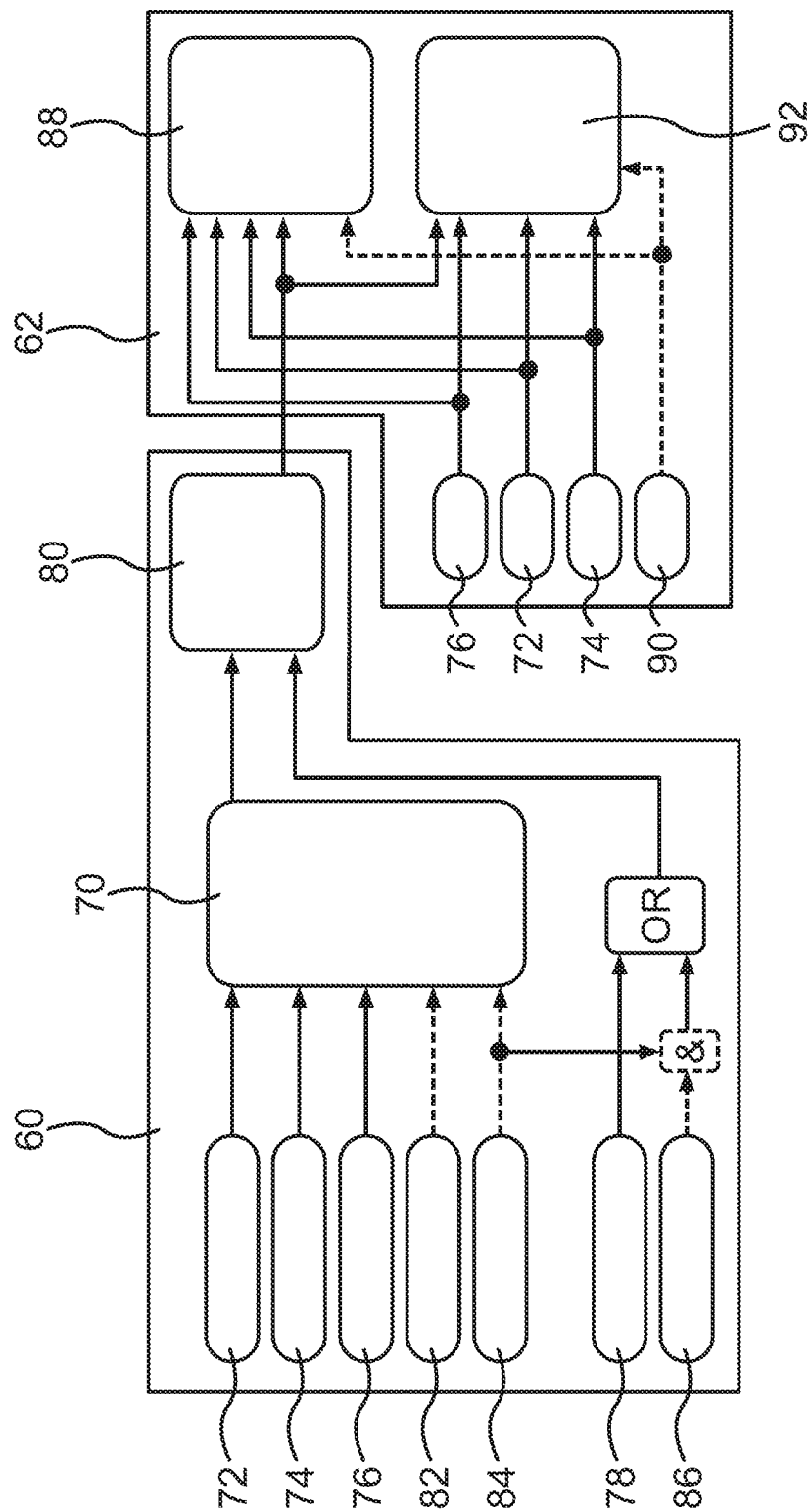
FIG. 5 is a representation illustrating the calculation of a quantity and an injection time of the late post-injection.

On the basis of FIG. 5, the calculation 60 is to be explained according to a possible alternative for its implementation. A number of parameters describing the operating state of the internal combustion engine, in particular the diesel engine, can be used to determine a reference charge pressure, for example, an engine speed of 72, an effective injection quantity 74 and a temperature 76 in an intake manifold or intake tract of the internal combustion engine. Furthermore, the boost pressure 78 in the intake manifold can also be taken into account. The reference charge pressure is then the charge pressure that should be present in the intake manifold at a predetermined combustion air ratio, taking into account the engine speed 72, the effective injection quantity 74 and the temperature 76 of the air or combustion air, in order to achieve the predetermined combustion air ratio. Taking into account the actual boost pressure 78 in the intake manifold, in a subsequent step 80, it is now possible, for example, to calculate a ratio which indicates the excess of boost pressure, i.e. the excess of combustion air.

By way of example, a difference or a quotient can be formed from the reference charge pressure and the actual charge pressure 78 to obtain the ratio. However, other ways of providing such a ratio are also conceivable. Furthermore, further parameters such as an ambient pressure 82 and an air mass 84 can also be used for the determination 70 of the reference charge pressure. Furthermore, the actual charge pressure 78 can be calculated from the air mass 84 and a filling 86 or the volumetric efficiency. The actual charge pressure 78 in the intake manifold therefore does not need to be measured. Rather, there are also other possibilities for determining the boost pressure 78.

Within the scope of calculation 60 (see FIG. 3), variables such as the temperature 76 of the air in the intake manifold, the engine speed 72, the effective injection quantity 74 and, if necessary, a temperature 90 of the exhaust gas in an exhaust gas manifold of the internal combustion engine, i.e. downstream of the exhaust valves, can be used to determine a quantity 88 of the post-injection 24. This temperature 90 can be measured by means of an appropriate temperature sensor.

When determining a point in time 92 of the non-torque effective quantity 88 injected into the combustion chamber in the course of the post-injection 24, the variables mentioned above can also be used to determine the quantity 88, taking into account the ratio determined in step 80.

Within the scope of the calculation 60 (see FIG. 3) of the post-injection 24, the quantity 88 and the point in time 92 for the post-injection 2 are thereby preferably determined. In addition, the combustion center, i.e. the state in which 50 percent of the mixture is combusted in the combustion chamber, is preferably determined. This determination is preferably made on the basis of the excess combustion air at the corresponding pressure in the intake manifold before entering the combustion chamber. The pressure downstream of the compressor of the exhaust gas turbocharger is thus preferably taken into account.

In the present case, the ratio indicating the excess boost pressure is preferably used to describe the combustion conditions in the combustion chamber. The determination of the excess boost pressure is summarized in the ratio by two important dependencies, namely the combustion air ratio and thus the availability of oxygen and the pressure in the cylinder before the start of the injection. On the basis of this ratio, the controlled late adjustment of the combustion can then be precisely controlled. This is advantageously done without the need for inherent latency feedback elements such as a lambda sensor or a temperature sensor that measures the temperature in the exhaust manifold downstream of the exhaust valves of the cylinders. However, the measured values supplied by such a temperature sensor can optionally be used to pre-control the ratio.

Due to the very precise control, the diesel engine or combustion engine does not produce any additional harmful emissions in the form of hydrocarbons, carbon monoxide and particles, despite the very late combustion situation. Furthermore, the dependence of the intake manifold pressure from the predetermined combustion air ratio (lambda) is taken into account in the calculation 60 of the excess boost pressure. At the same time, the ratio determined in step 80 (see FIG. 5) is also addressed in the characteristic map structure, in which the quantity 88 of the post-injection 24 and the point in time 92 of the post-injection 24 are determined.

Instead of the point in time 92 of the post-injection 24 after the main injection, which can be indicated, for example, in degrees of crankshaft angle, an injection pause can also be specified, which is present between the main injection and the post-injection 24. The characteristic map structure of the post-injection quantity and the injection pauses also has an influence on the mixture preparation in the combustion chamber before the top dead center.

Due to the late post-injection 24 during the shifting process, the boost pressure drop can be significantly reduced. The post-injection 24 is set off so late relative to the top dead center in which the ignition of the mixture takes place that the post-injection 24 has no or hardly any effect on the torque.

Due to the late, but still combusting, post-injection 24, the total injection quantity and thus the enthalpy of the exhaust gases can be significantly increased.

In the case of the diesel engine, the late adjustment can be easily implemented by stopping the late post-injection 24. In a similar way, however, the principle of efficiency deterioration during the combustion of fuel can also be achieved with a petrol engine, for exampling by adjusting the ignition timing.

The invention claimed is:

1. A method for operating an internal combustion engine of a motor vehicle with an automatic transmission, in which a torque generated by the internal combustion engine is reduced depending on an operating state of a drive train of the motor vehicle, comprising:
   determining whether or not a reduction of torque delivered by the internal combustion engine is present,
   when the reduction of the torque delivered is present, evaluating any of load data, accelerator pedal position data, rotational speed data, engaged gear data, boost pressure data, and engine temperature data, and checking if a predetermined operating state is enabled based on the data, and otherwise ending;
   when the predetermined operating state is enabled, checking whether the reduction of the torque is less than a predetermined limit, and otherwise ending;
   when the torque is less than said predetermined limit, determining an excess of combustion air relative to an amount of air for a predetermined combustion air ratio; and
   based on said excess of combustion air, modifying operation of the internal combustion engine.

2. The method according to claim 1, wherein the torque delivered by the internal combustion engine is reduced when changing a gear.

3. The method according to claim 1, wherein the torque delivered by the internal combustion engine is reduced when an intervention is caused by an electronic stability program.

4. The method according to claim 1, wherein the torque delivered by the internal combustion engine is reduced when the motor vehicle is creeping.

5. The method according to claim 1, wherein a quantity of late post-injection of fuel is adjusted depending on the excess of combustion air.

6. The method according to claim 2, wherein the torque delivered by the internal combustion engine is reduced when an intervention is caused by an electronic stability program.

7. The method according to claim 2, wherein an operating state of the internal combustion engine is taken into account for determining the excess of combustion air.

8. The method according to claim 3, wherein
   parameters describing an operating state of the internal combustion engine are taken into account for determining the excess of combustion air.

9. The method according to claim 4, wherein
   an operating state of the internal combustion engine is taken into account for determining the excess of combustion air.

10. The method according to claim 1, wherein the operation of the internal combustion engine is modified by calculating a quantity and an injection time for late fuel injection at each gear change, and implementing said late fuel injection in said quantity and for said injection time at each gear change.

11. The method according to claim 1, wherein the operation of the internal combustion engine is modified by determining a reduction in efficiency of the internal combustion engine, and adjusting one of an ignition timing of the internal combustion engine and an injection timing of a main fuel injection based on the efficiency reduction.

12. The method according to claim 1, wherein a point in time of the late post-injection of fuel is adjusted depending on the excess of combustion air.

13. The method according to claim 1, wherein both a quantity of late post-injection fuel and a point in time of the late post-injection of fuel are adjusted depending on the excess of combustion air.

* * * * *